United States Patent [19]

Heine et al.

[11] Patent Number: 5,544,895
[45] Date of Patent: Aug. 13, 1996

[54] SHAFT PACKING

[75] Inventors: Steffen Heine, Kuhsen; Heiko Schumacher, Bad Oldesloe; Rolf Johnen, Hoisdorf, all of Germany

[73] Assignee: Dichtungstechnik G. Bruss GmbH & Co. KG, Hoisdorf/Hamburg, Germany

[21] Appl. No.: 271,604

[22] Filed: Jul. 7, 1994

[30] Foreign Application Priority Data

Jul. 21, 1993 [DE] Germany .......................... 43 24 529.3

[51] Int. Cl.⁶ .......................................................... F16J 15/32
[52] U.S. Cl. ............................... 277/9.5; 277/62; 277/152
[58] Field of Search .............................. 277/9.5, 11, 62, 277/152, 35

[56] References Cited

U.S. PATENT DOCUMENTS

| | | | |
|---|---|---|---|
| 2,177,441 | 10/1939 | Pesarese | 277/152 |
| 3,250,541 | 5/1966 | McKinven, Jr. | 277/152 |
| 3,941,393 | 3/1976 | Bainard | 277/9.5 |
| 4,427,201 | 1/1984 | Belsanti | 277/152 |
| 5,015,001 | 5/1991 | Jay | 277/37 |
| 5,342,065 | 8/1994 | Blanke | 277/152 |

FOREIGN PATENT DOCUMENTS

| | | | |
|---|---|---|---|
| 3640577 | 4/1988 | Germany | 277/152 |
| 3927458 | 2/1991 | Germany | 277/152 |
| 3929065 | 3/1991 | Germany | 277/152 |
| 61-157877 | 7/1986 | Japan | 277/152 |
| 496546 | 11/1938 | United Kingdom | 277/152 |
| 602792 | 6/1948 | United Kingdom | 277/152 |

*Primary Examiner*—Thomas B. Will
*Assistant Examiner*—John L. Beres
*Attorney, Agent, or Firm*—Lawrence J. Shurupoff

[57] ABSTRACT

A shaft packing includes a casing and at least two polymeric disks. One disk forms a protective lip and the other disk forms a packing lip. The internal diameters of the disks are smaller than the external diameter of the shaft to be packed. Between the two disks is positioned an expanding ring which ensures an inversion and expanding of the packing lip in the opposite direction to the protective lip.

5 Claims, 1 Drawing Sheet

SHAFT PACKING

BACKGROUND OF THE INVENTION

1. Field of the Invention

The invention relates to a shaft packing with a casing between whose legs is clamped a disk-like packing member having one disk forming a protective lip and the other disk a packing lip, the internal diameter of the disks in the unfitted state of the shaft packing being smaller than the external diameter of the shaft to be packed or sealed and an expanding ring is positioned between the disks.

2. Description of Prior Developments

In the case of DE 3,601,349 A1 an expanding ring is made from an elastomer and in the case of U.S. Pat. No. 3,250,541 the expanding ring is a metal part.

A similar shaft packing is also known from DE 3,927,458 A1, in which a disk-like packing member having a packing lip is formed by a conical, polymeric material disk constructed in the manner of a cup spring. The disk is provided radially from the inside with a slit, so that in the unfitted state a protective lip and a packing lip are formed, whose packing edges engage on one another. The arrangement is such that the diameter of the packing edges in the unfitted state of the shaft packing corresponds to the shaft diameter of the shaft to be packed. The slit is made in the disk under an angle such that the wall thickness of the protective lip increases radially outwards and that of the packing lip radially inwards.

On pressing onto the shaft, the packing lip is inverted in the direction counter to the overall inclination of the packing disk with respect to the shaft axis in such a way that the packing lip presses elastically radially inwards onto the shaft circumference and consequently brings about the desired packing solely as a result of its intrinsic elasticity without using a worm spring such as is conventionally used with shaft packings.

However, the above-described construction suffers from the following disadvantages. Producing the slit radially from the inside is complicated, particularly in connection with the necessary precision of the angular position relative to the axis. With regards to the tolerances of the shaft and the packing disk it is difficult to orient the packing edges of the protective lip and the packing lip precisely to the external diameter of the shaft to be packed. This is necessary in the known construction, because if there is the slightest radial overlap of the particular packing edge and the shaft diameter it is no longer possible to fit the packing. It must then be expected that both the protective lip and the packing lip will invert in the same direction, which does not permit the necessary packing or sealing action.

The problem of the invention is to so construct a shaft packing of the described type, that the indicated disadvantages are avoided and a simple manufacture and fitting are ensured without any risk of inverting the protective lip or packing lip in the same direction and at the same time always guaranteeing a reproducible, good packing or sealing action.

Summary of the Invention

In the case of the shaft packing according to the invention at least two polymeric material disks of different thicknesses are clamped between the legs of a preferably sheet metal, bent casing. The two disks are separated by a tube in the radial direction with respect to its axis, so that radially the disks have the same width and edge angle of 90°. On the radial inside the thinner disk acts as the protective lip and the thicker disk the packing lip. In the unfitted state the internal diameter of the two disks is smaller than the external diameter of the shaft to be packed and the two disks, in the unfitted state, at least radially are externally engaged on one another with a basic inclination with respect to the shaft axis. In order during installation to prevent an inversion of the protective lip in the same direction as the packing lip or vice versa, an expanding ring is fitted between the two disks, which is made from a solid material, which has lubricating characteristics and has a melting point close to the operating temperature of the packing. For example, the expanding ring is made from wax or grease.

This expanding ring on the one hand prevents the inversion of the protective or packing lip during fitting in the "incorrect" direction. As the expanding ring melts following the first rotations of the shaft, said expanding ring also ensures a good permanent lubrication both of the contact point between the packing lip and shaft and also the contact point between the protective lip and shaft in operation.

The casing leg supporting the protective lip advantageously has a cone angle predetermined by the basic inclination of the shaft packing relative to the shaft axis on a cross-sectionally straight path, which roughly corresponds to half the radial width of the disk with the protective lip. However, the casing leg supporting the disk with the packing lip is rolled in with a rolling radius, which gives a favourable bending radius as a function of the internal diameter of said disk on the shaft in the shaft packing fitted state. The protective lip-side leg preferably has an inclination of around 20° with respect to the perpendicular to the shaft axis, whereas the inclination of the packing lip to said perpendicular in the opposite direction is advantageously 25° to 45°, preferably approximately 30°.

BRIEF DESCRIPTION OF THE DRAWINGS

The invention is described in greater detail hereinafter relative to a non-limitative embodiment and the attached drawings, which show.

DETAILED DESCRIPTION OF THE PREFERRED EMBODIMENTS

Figure 1:
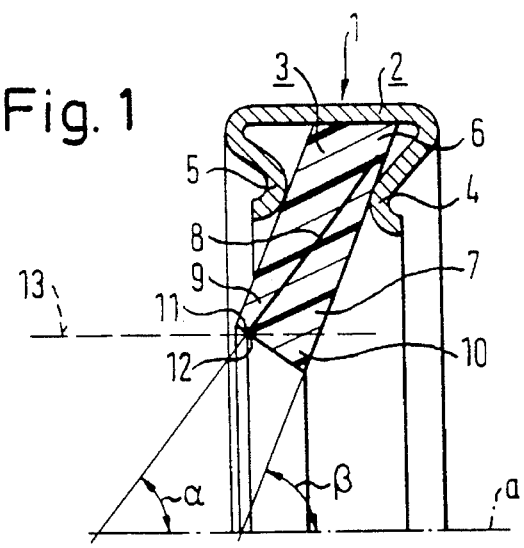
FIG. 1 a shaft packing according to DE 3,927,458 A1 in half-cross-section and the uninstalled state, the diameter of the shaft to be packed being represented in broken line form.

The shaft packing 1 according to FIG. 1 has a sheet metal casing 2 which, with its two legs 4,5, clamps a polymeric material packing disk 3. In the undeformed state disk 3 has a trapezoidal cross-section with a basic inclination under an angle β with respect to the shaft axis a, the external diameter of the shaft being indicated in broken line form at 13.

The packing disk 3 has a radially outwardly positioned adhesion part 6 connected to the casing 2 and a packing part 7 facing the axis a and which is split by a slit 8 into a protective lip 9 and a packing lip 10. The slit 8 is inclined under an acute angle α to the shaft packing axis a. The slit 8 runs from the internal circumference of the packing disk 3 from the point which corresponds to the external diameter 13 of the shaft to be packed. In other words the diameter of the packing edges 11,12 formed by the slit 8 on the protective lip 9 and the packing lip 10 is the same as the external diameter of the shaft 13. Thus, there is no overlap between the packing edges 11,12 and the shaft in the fitted state. By bending the packing lip 10, during fitting, in the opposite direction to the basic inclination (angle β) about the rolled in leg 4 of the casing 2 the radial force necessary for packing or sealing purposes is produced.

Tests performed by the applicant have shown that for implementing a shaft packing according to German patent 3,927,458 as shown in FIG.1 the desired bending or inversion of the protective or packing lip 9 or 10 in the opposite direction to the other lip and the desired sealing or packing action can only be obtained if the contact points between the legs 5,4 of the casing 2 and the outsides of the packing disk are on precisely the same diameter and if the packing edges 11,12 coincide precisely with the shaft external diameter 13. This is only achievable in exceptional cases in practice due to the unavoidable manufacturing tolerances.

Figure 2:
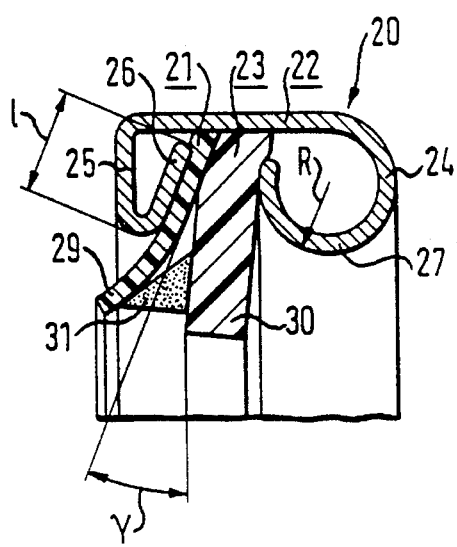
FIG. 2 in partial cross-section similar to FIG. 1 a shaft packing according to the invention in the uninstalled state.
Figure 3:
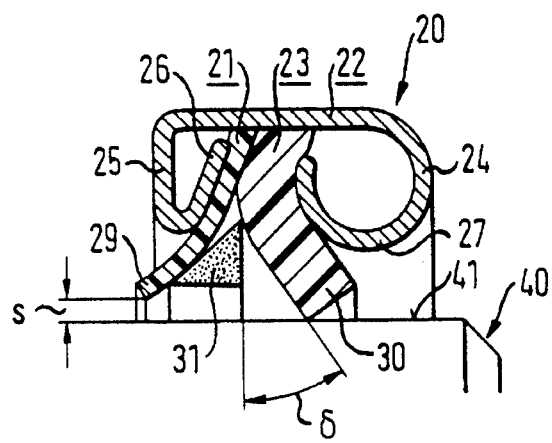
FIG. 3 in partial cross-section similar to FIG. 1, a shaft packing according to the invention in a state immediately following installation.
Figure 4:
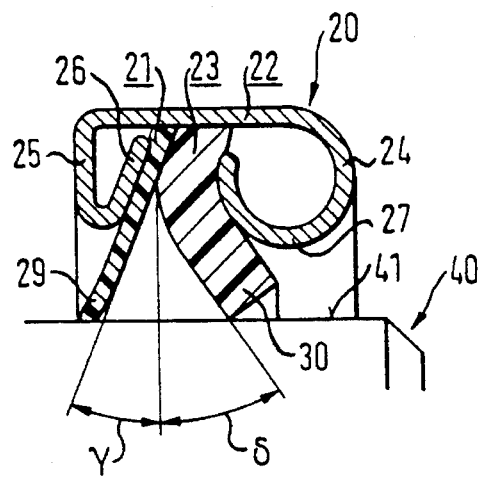
FIG. 4 in a cross-section similar to FIGS. 2 and 3, the shaft packing according to the invention after insertion.

FIGS. 2 to 4 show a shaft packing 20 according to the invention prior to fitting (FIG. 2), immediately after fitting (FIG. 3) and following entry (FIG. 4) onto the shaft 40 to be packed. Two disks 21,23 are clamped between the two legs 24,25 of a casing 22. The two disks 21,23 radially parted by a polymeric material tube have the same external diameter, whereas the internal diameter of the disk 21 is preferably somewhat larger than that of the disk 23. On its radially inner edge, the thinner disk 21 forms a protective lip 29 and the thicker disk 23 forms on its inner end a packing lip 30.

The casing 22 is shaped in one piece from a sheet metal part. The inner end of the leg 25 is folded round to a conical part 26 with a cross-sectionally linear configuration, the cone angle γ being approximately 20° with respect to a perpendicular to the circumference of the shaft 40 to be packed. The linear conical part 26 extends over a length 1, which roughly corresponds in the radial direction to half the width extension of the disk 21.

The leg 24 is in the form of a circular, rounded rolling portion 27, which is rounded with a predetermined rolling radius R.

Between the packing disks 21 and 23 is inserted an expanding separating or wedging ring 31, which is preferably made from wax or a grease with a melting point close to the operating temperature of the packing and which temperature is a result of the friction between the packing lip 30 and the circumference of the shaft 40. However, the expanding ring can also be made from a material having a higher melting point.

The rolling radius R is selected in such a way that in the fitted or installed state, independently of the internal diameter of the disk 23 according to FIG. 3, the packing lip 30, with respect to the perpendicular to the circumference 41 of the shaft forms an angle δ of 25° to 45° preferably approximately 30° inclined in the opposite direction to the angle γ.

In cross-section, the expanding ring forms a right-angled, equilateral triangle in such a way that the hypotenuse engages on the inner flank of the disk 21 and the radially outer tip contacts the outside of the disk 23. Thus, in the fitted state the protective lip 21 initially leaves free a radial gap s with respect to the external circumference 21, whereas as a result of its inversion the packing lip 30 presses elastically inwards with a radial force on the shaft circumference 41. When the shaft packing enters, the packing lip 30 and therefore the disk 23 rapidly assumes the operating temperature, so that the wax or grease expanding ring 31 melts and consequently ensures the lubrication of the contact points between the packing lip 30 and the protective lip 29, the gap s is no longer present due to the elimination of the expanding ring, as well as the shaft circumference 41.

We claim:

1. A shaft packing for sealing a shaft comprising:
   a casing comprising a first leg and a second leg;
   a first polymeric disk forming a first sealing lip having a first internal diameter, said first disk being clamped between said first and second legs;
   a second polymeric disk forming a second sealing lip having a second internal diameter, said second disk being clamped between said first and second legs; and
   a ring disposed between and separating said first and second sealing lips and expanding at least said first internal diameter, said ring comprising a solid lubricant material which melts during use and thereby lubricates said shaft.

2. The shaft packing according to claim 1, wherein the solid lubricant material is selected from the group consisting of wax and grease.

3. The shaft packing according to claim 1, wherein the first and second legs are shaped to provide an inclination angle to the first disk with respect to the shaft axis and to provide a bending radius to the second disk.

4. The shaft packing according to claim 3, wherein the first leg comprises a planar conical part with a cone angle corresponding to the inclination angle of the first disk.

5. The shaft packing according to claim 3, wherein the second leg comprises a rolling part with a rolling radius corresponding to the bending radius.

\* \* \* \* \*